United States Patent
Chu et al.

(10) Patent No.: US 8,422,448 B2
(45) Date of Patent: Apr. 16, 2013

(54) GROUP CALL CONTROL IN A WIRELESS BROADBAND COMMUNICATION NETWORK

(75) Inventors: Thomas P. Chu, Englishtown, NJ (US); Tewfik Doumi, Edison, NJ (US); Ramesh Nagarajan, Princeton Junction, NJ (US)

(73) Assignee: Alcatel Lucent, Paris (FR)

( * ) Notice: Subject to any disclaimer, the term of this patent is extended or adjusted under 35 U.S.C. 154(b) by 272 days.

(21) Appl. No.: 12/895,734

(22) Filed: Sep. 30, 2010

(65) Prior Publication Data

US 2012/0033623 A1 Feb. 9, 2012

Related U.S. Application Data

(60) Provisional application No. 61/371,977, filed on Aug. 9, 2010.

(51) Int. Cl.
*H04W 4/00* (2009.01)
(52) U.S. Cl.
USPC .......................................... 370/329; 370/328
(58) Field of Classification Search ............... 370/328, 370/329
See application file for complete search history.

(56) References Cited

U.S. PATENT DOCUMENTS

| | | | | |
|---|---|---|---|---|
| 5,493,695 | A * | 2/1996 | Aitkenhead et al. | 455/509 |
| 7,480,294 | B1 * | 1/2009 | Hansen et al. | 370/389 |
| 2003/0096628 | A1 * | 5/2003 | Bar-On et al. | 455/518 |
| 2003/0153342 | A1 * | 8/2003 | Crockett et al. | 455/519 |
| 2006/0063550 | A1 * | 3/2006 | Martin et al. | 455/518 |
| 2008/0200162 | A1 * | 8/2008 | Chowdhury et al. | 455/422.1 |
| 2010/0142517 | A1 * | 6/2010 | Montemurro et al. | 370/352 |
| 2011/0122783 | A1 * | 5/2011 | Lin et al. | 370/252 |
| 2011/0305137 | A1 * | 12/2011 | Chu et al. | 370/230 |

* cited by examiner

*Primary Examiner* — Kenny Lin
(74) *Attorney, Agent, or Firm* — S. Wyse

(57) ABSTRACT

A method and system for group call control in a broadband wireless network. A group call (push-to-talk) server initiates and regulates group call communication sessions. A wireless base station communicates with one or more group call participants. When a request to participate in a group call is received, it is examined to see if it contains a group call ID or other group call indicator. If not, regular call resources are allocated, if available. If so, it is determined whether another group member is attached to the base station. Group call resources are then reserved, if available, based on this determination. The resources allocated for the group call may also depend on whether the system supports multicast on the downlink to group members, or whether losing audio is supported. In some embodiments, network resources may be reallocated to support the group call.

16 Claims, 6 Drawing Sheets

GROUP CALL CONTROL IN A WIRELESS BROADBAND COMMUNICATION NETWORK

CROSS-REFERENCE TO RELATED APPLICATIONS

The present disclosure is related to and claims priority from U.S. Provisional Patent Application Ser. No. 61/371,977, entitled Call Control for Talk Groups Over LTE Networks, and filed on 9 Aug. 2010, the entire contents of which are incorporated by reference herein.

TECHNICAL FIELD

The present invention relates generally to the field of communication networks, and, more particularly, to a method and apparatus for controlling admission and resource allocation for group calls in a broadband wireless communication network such as an LTE or LTE/IMS network.

BACKGROUND

The following abbreviations are herewith defined, at least some of which are referred to within the following description of the state-of-the-art and the present invention.

| | |
|---|---|
| 3GPP | 3$^{rd}$ Generation Partnership Project |
| AF | Application Function |
| ARP | Allocation and Retention Priority |
| BSR | Bearer Setup Request |
| DS | Dynamic Scheduling |
| EPS | Evolved Packet System |
| GBR | Guaranteed Bit Rate |
| HSS | Home Subscriber Server |
| IMS | IP Multimedia Subsystem |
| IP | Internet Protocol |
| IP-CAN | IP Connectivity Access Network |
| LTE | Long Term Evolution |
| MBMS | Multimedia Broadcast and Multicast Service |
| MBR | Maximum Bit Rate |
| MME | Mobility Management Entity |
| PCRF | Policy and Charging Rule Function |
| PDN-GW | Packet Data Network Gateway |
| PS | Persistent Scheduling |
| PTT | Push to Talk |
| RRC | Radio Resource Control |
| QCI | QoS class identifier |
| QoS | Quality of Service |
| SPS | Semi-Persistent Scheduling |
| SR | Service Request |
| TFT | Traffic Flow Template |
| UE | User Equipment |
| URI | Uniform Resource Identifier |
| VoIP | Voice over IP |

Wireless communication networks are, as a matter of necessity, structured somewhat differently than their wireline, or POTS (plain old telephone service) predecessors. In general, a wireline system involves a large number of telephones, one or more of which each belong to a different subscriber. The phone or phones belonging to each subscriber are connected by a pair of wires to a switch located, for example, in a central office. When a call from one of these phones is placed, the central office sets up a circuit from the calling party through a variety of interconnected switches arranged in a hierarchical topology to the called party. The circuit remains in place until the call is completed, and then the network resources are freed for use by others.

In a wireless network, generally-speaking, base stations are installed in various geographic locations across a network-coverage area. Base stations are equipped with antennas and radio transceivers to communicate over an air interface with mobile telephones and other devices that are within range. Because each base station only communicates with mobile devices in their vicinity, transmission power for both the base station and the mobile device can be kept relatively low. In addition to reducing the power requirements for portable (and often battery-powered) mobile devices, this also allows for radio communications using the same frequencies by other base stations and mobile devices not in the immediate vicinity.

A mobile device may make or receive calls via a nearby base station. In either case, as a communication session is being initiated the base station assigns certain bearer resources that are expected to be needed for the call. A bearer resource is a communication channel or channels for carrying uplink communication traffic from the mobile device to the base station and downlink traffic from the base station to the mobile device. Resources are reserved when a communication session is set up to ensure that the quality of the anticipated call may be preserved. (Other channels may be reserved for control signaling.) A reserved channel may be a single radio frequency, but in many cases this single radio frequency may be shared with other communication sessions, for example by assigning certain time slots on that frequency to each session. Various scheduling routines are used to allocate time slots for transmission. Calls that cannot be satisfactorily accommodated are usually not set up. A reserved bearer resource may be released when the session has been terminated or when the mobile device relocates and continues the communication session using another base station.

As might be apparent, base stations, which may communicate with a large number of nearby mobile devices, are typically fixed in one location. From there they are connected to a network that allows communications to a great many other devices, for example wireless devices communicating through other base stations, or via a gateway device with telephones and other devices that are associated with different networks.

Another difference between many modern wireless networks and traditional POTS networks is that network communications may be effected using packet switching technology rather than by a dedicated circuit. (Although note that some wireline access networks may use packet switching as well.) In packet switching, information, including data representing the sounds of a voice communication, is divided into discrete data segments such as packets or frames. These packets are individually addressed and transmitted over a series of network nodes until they reach their destination, where they are reassembled to reproduce the transmitted data. In VoIP (voice over Internet Protocol), for example, this is done rapidly enough to enable the transmission of coherent voice conversations.

One service that may be offered by wireless networks is group calls. Here, two or more parties with appropriately-equipped mobile devices may effectively set up a multi-party communication session. In this session, a voice communication enunciated by one party is transmitted to all members of the group. Other members of the group may then speak in turn; network protocols are in place to govern whose turn it is speak. For example, any group member may request "the floor" by sending a request. In many systems, this involves pressing a key on the mobile device, and the service is sometimes referred to as "push-to-talk" (PTT). In any event, when the floor is granted, the requester is normally allowed to transmit to the other group members until the floor is released, for example by releasing the PTT button. If another group member requests the floor when it has been allocated already, their request is usually denied and they must wait and try again at a later time. The exact rules for permitting transmissions to the group may of course vary from one network to another.

In a broadband wireless network PTT environment, each user communicates with the network as if they were making or receiving a call. That is, a communication bearer is established between each nearby group member and the appropriate bearer resources are allocated. Each group member then in effect in involved with a communication session, usually with a PTT server of some kind that may be accessed through the wireless network and a packet data network via a PDN-GW. The PTT server then allocates speaking time ("the floor") according to the rules that are in place, and actually handles the task of transmitting received group transmissions to the appropriate group members. The base station, such as the eNodeB in an LTE network, is unaware that the call is a group call and simply handles communications between the PTT server and the UE as if they were each individual voice calls.

Network resources such as the bearer resources over the air interface used by members of a talk group are valuable, and sometimes scarce. Plentiful or even adequate resources can frequently be guaranteed only by a greater infrastructure implementation. Providing inadequate resources results in customer dissatisfaction and in some cases more serious consequences. PTT group call may, for example, be used by first responders and emergency workers to aid persons and property in immediate danger. Naturally, refusing to set up a group call under such circumstances could be disastrous. A manner of more efficiently allocating broadband wireless network resources in the PTT environment is therefore needed.

Accordingly, there has been and still is a need to address the aforementioned shortcomings and other shortcomings associated with group call admission control. These needs and other needs are satisfied by the present invention.

SUMMARY

The present invention is a method of call control (admission control and UE transmission service scheduling), and specifically call control for group calls in broadband wireless networks, such as LTE networks in which a bearer is established for communication between a UE belonging to a talk group and a PTT server. In one aspect, the present invention is a method for group call admissions control in a broadband wireless communication network including receiving at a network base station a call setup request, determining whether the call setup request contains a group ID, determining, if the call setup request contains a group ID, whether base station resources are already allocated to the identified group, determining, if resources have already been allocated to the group, whether additional resources are required to set up the call, and admitting the call if no additional resources are required. In a preferred embodiment, determining the need for additional resources includes determining how many group UEs are already attached to the base station. The method may also include determining whether any additional resources required to set up the call are available. The method may further include admitting the call if any additional resources required to set up the call are determined to be available, or rejecting the call setup request if the required additional resources are not available. Prior to rejecting the call setup request, in some embodiments also include determining whether a portion of the required additional resources can be disregarded as non-essential, or whether resources reserved for other calls may be re-allocated so that the call setup may proceed. When a call is admitted after determining that the required resources are available, the resources related to the call setup request are reserved, and a bearer is established between the UE and, for example, a PDN-GW to a packet data network.

In another aspect, the present invention is a method for group call admissions control in a broadband wireless communication network including receiving a call setup request, for example at the base station of a wireless network, determining whether the call setup request contains a group call indicator, determining, if the call setup request contains a grout call indicator, whether the call set up request contains a group ID, determining, if the call setup request contains a group ID, whether the group is active, determining, if the group is not active, whether the resources required for the group call are available, and admitting the group call if it is determined that the group is not active and the resources required for the group call are available. The method may further include determining whether losing audio is to be supported for the group call, and setting one or more resource allocation increment thresholds for later use in determining whether to admit addition members of the group.

In another aspect, the present invention is a base station for a broadband wireless communication network, the base station including a controller, a memory device, an admission controller in communication with the controller and with the memory device, wherein the admission controller determines for every group call setup request received at the base station whether the group is active with the respect to the base station. Also included in this aspect of the presentation is a resource allocation table for recording resources reserved for each group call active at the base station and any resource thresholds that have been set, an allocation rules table for recording resource determination criteria, and a transmission scheduler for prioritizing transmissions according to currently-set scheduling rules.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to method and system for group call control in a broadband wireless communication network. This group call control attempts to enable the network to make more efficient use of network resources in certain group call environments by providing new systems for admission control and scheduling. The present invention may be implemented for handling group calls in any wireless environment, but may be of greatest advantage when handling group calls involving a number of participants located in relatively-close proximity, an environment not uncommon, for example, to first responders in an emergency situation, construction workers on a building project, or employees in a large factory or warehouse.

Figure 1:
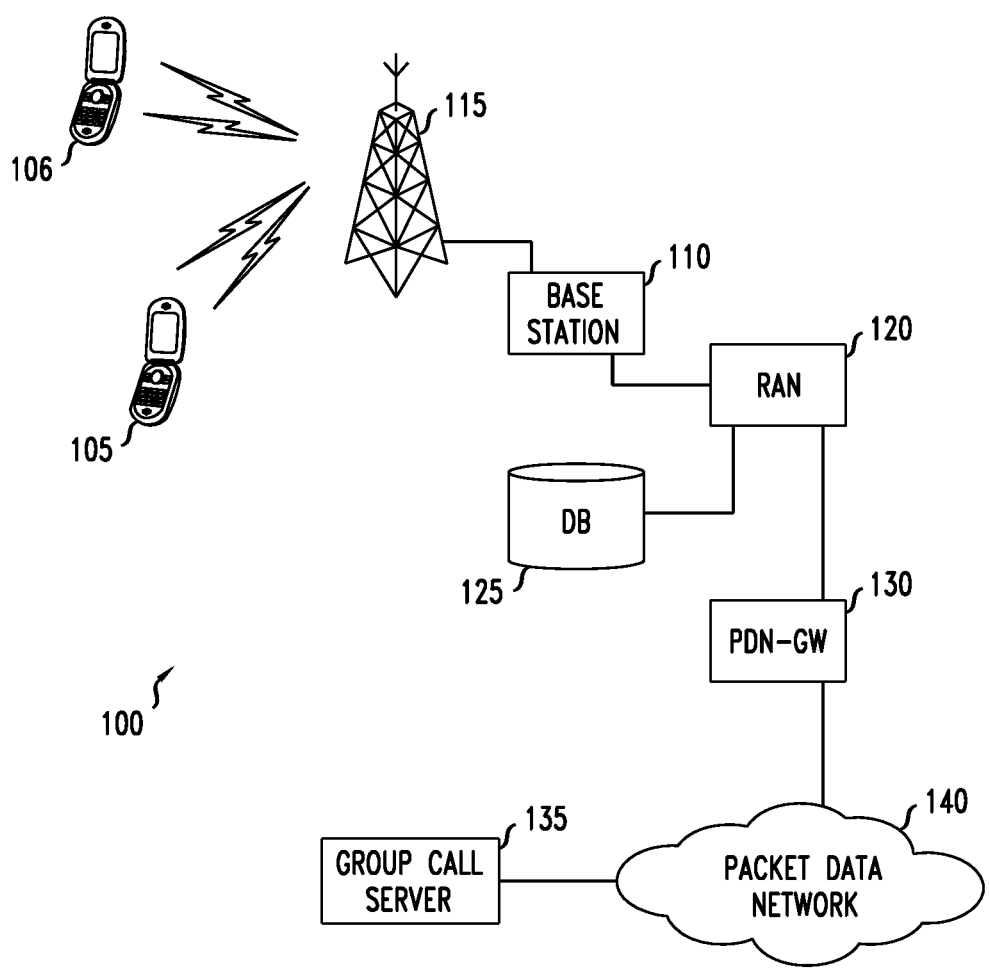
FIG. 1 is a simplified schematic diagram illustrating selected components of a wireless network according to an embodiment of the present invention.

A wireless communication network provides wireless network access to callers equipped with wireless communication devices such as mobile telephones. FIG. 1 is a simplified schematic diagram illustrating selected components of a wireless network 100 according to an embodiment of the present invention. Note that this portion of wireless network 100 is somewhat generally depicted. Network 100 includes a base station 110 deployed in association with an antenna 115. In a typical wireless network, of course, there are a great many base stations; for convenience only one is shown in FIG. 1. Base station 110 communicates with nearby wireless devices over a wireless channel. These wireless devices, which are typically but not necessarily portable hand-held radio communication devices, vary widely in design and capability. For this reason they are often simply referred to in this context as UE (user equipment). Exemplary UEs (UE devices) 105 and 106 are shown in FIG. 1.

In the embodiment of FIG. 1, base station 110 is in direct communication with switch 120. Switch 120 assists with managing and directing the calls to and from the UEs 105 and 106 via base station 110. In a typical network, switch 120 would often supervise a number of base stations in this manner. Switch 120 is in communication with database 125 where information about network subscribers is stored, for example where they are currently located and what services are currently available for their use.

In this embodiment, calls involving UEs 105 and 106 are routed through switch 120. Not all calls are local to the switch, and therefore calls often must be routed through a larger packet data network 140 via a gateway 130. (In some implementations, calls that could, for example, be routed by switch 120 directly to another base station (not shown) are instead routed via data network 140.) Through the packet data network, calls can be directed along whatever route is appropriate for them to reach their destination. This may be another UE device or an application server of some kind (not shown in FIG. 1).

In the embodiment of FIG. 1, it is presumed that a group call service is available. As alluded to above, a group call service, generally speaking, allows subscribers to a wireless communication network to engage in a communication session with one or more other users, where each can speak in turn and have their communications sent to each of the other members of the call group. To facilitate these sessions, a group call server 135 is made available via the packet data network 140.

When a UE, such as UE 105, indicates a desire to participate in a group call, the request is forwarded by switch 120 to group call server 135 via PDN gateway (PDN-GW) 130 and packet data network 140. Presuming that this is a service available to the subscriber, the group call server 135 begins the process of setting up the call. This includes notifying base station 110 that such a call session is being requested so that the appropriate communication resources, such as one or more channels for communicating with UE 105, can be reserved.

According to this embodiment of the present invention, the notification sent to the base station 110 from group call server 135 includes at least an indication that the call setup request is a group call request, and an ID number identifying the group. Note that in some alternate embodiments, the inclusion of a group ID number in the notification in itself serves as an indication that the request is associated with a group call. In any event, in accordance with the present invention, call resources are allocated in such a way as to try to minimize the burden of the group call on the network, as will now be described in greater detail.

Figure 2:
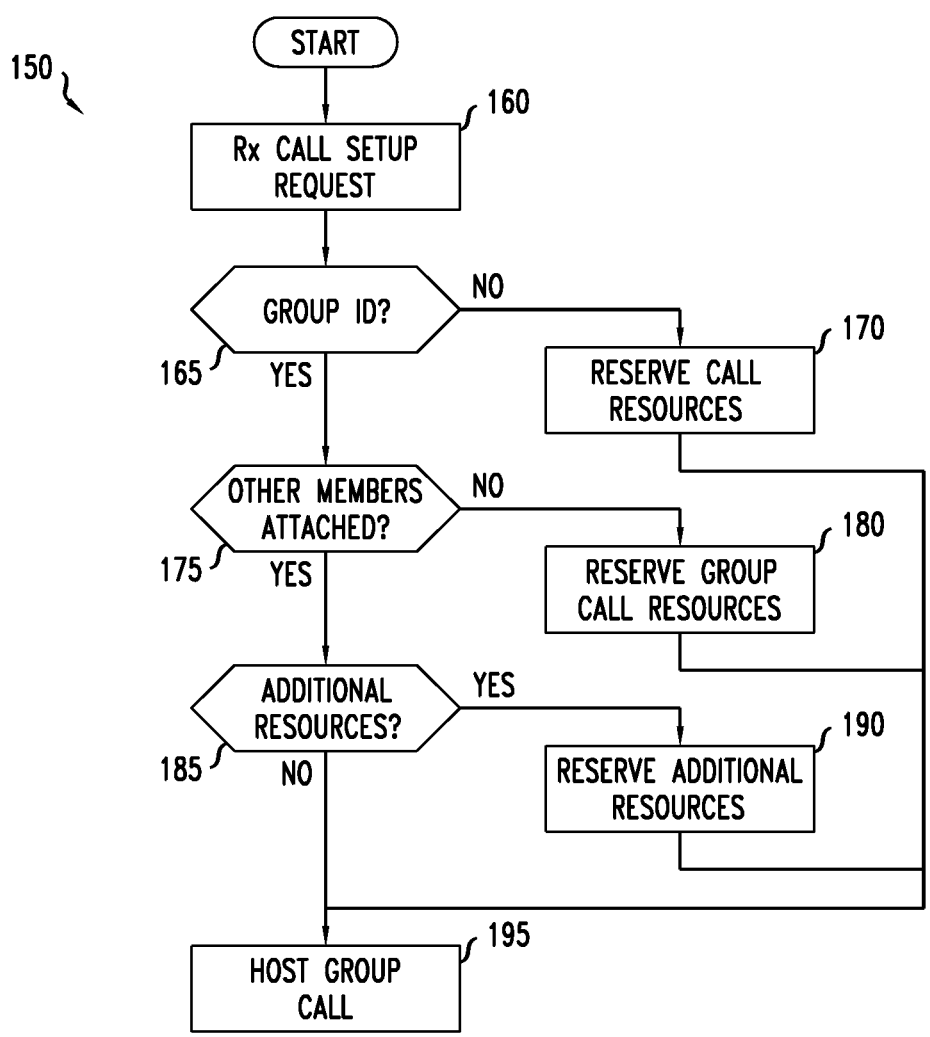
FIG. 2 is a flow diagram illustrating a method of group call control according to an embodiment of the present invention.

FIG. 2 is a flow diagram illustrating a method 150 of group call control according to an embodiment of the present invention. Initially, it is noted that as used herein, "group call control" describes a manner, according to a respective embodiment, of group call admission control, or resource scheduling, or both. Referring to FIG. 2, at START it is presumed that the components for performing this embodiment of the present invention are available and operational.

The process of this embodiment then begins with the receipt of a call setup request (step 160). When the call setup request is received, a determination is made (step 165) as to whether it includes a group ID. In this embodiment, receipt of a call setup message including a group ID is taken as an indication that the request is associated with a group call. In other embodiments, the call setup request may also include a separate group call identifier. Note that in the embodiment of FIG. 2, the receipt and determination steps (160 and 165) most likely occur in a broadband wireless network base station (see, for example, base station 110 of FIG. 1).

In this embodiment, if the call setup request does not contain a group ID or other indication that a group call setup is being requested, then the call resources required for the requested call are reserved (step 170) according to whatever procedures are in place. This may be, for example, the reservation of an uplink channel and a downlink channel, with extra resources reserved for control messages if necessary. Note that in this embodiment, it is presumed that the resources that need to be reserved for a regular (individual) voice call are pre-determined (even if adjustable) and available. The resources needed for control signaling will typically vary according to the type of signaling used. Note also that a 'channel' may, for example, include a specified frequency or time slot; the exact nature of the channel or channels allocated or used are not a requirement of the present invention unless explicitly recited in a particular embodiment or apparent from the context.

In the embodiment of FIG. 2, if it is determined at step 165 that the call setup request includes a group ID, then it is determined (step 175) whether there are other members of the call group already attached. That is, a determination is made at step 175 as to whether resources for this group call have already been reserved. In most implementations, this involves the allocation of wireless channels a bearer from the UE (or UEs) to a PDN-GW, although in other embodiments additional interfaces may need to be reserved as well. With this in mind, the question of whether a particular group has other members attached usually refers in essence to whether other members of the group call have already reserved resources at the base station.

If not, then the group call resources needed are reserved (step 180) at this time. Note that while reservation steps 170 and 180 are shown separately, in some embodiments they amount to essentially the same operation. In other embodiments, the reservation for an individual voice call may vary somewhat from the reservation for the first caller of a group call to attach. Determining the needed group call resources (not separately shown in FIG. 1) varies with each embodiment. In the embodiment of FIG. 2, the call resources reserved for the group call are the same as those for an individual voice call, though they are reserved as resources associated with the identified group.

In some implementations, additional group call resources may be reserved in some circumstances, for example, depending on the number of group call members that are attached. In the embodiment of FIG. 2, if a determination is made at step 175 that other members of the call are already attached, then a determination is made (step 185) as to whether additional resources are now required. If not, the group call is simply hosted (step 195), that is, allowed to continue, until its termination (not shown). At termination, group call resources may of course be released for use by others.

In accordance with the present invention, additional resources are typically though not necessarily reserved when additional member wishes to attach to the group call. Additional resources may be required, for example, to accommodate the additional control signaling burden added by the additional member or members. In some circumstances, such as when the number of attached call members exceeds a certain threshold level, or if a feedback mechanism indicates that the resources reserved are inadequate additional resources may be reserved depending on the network policies. The responses to such conditions are described more fully below. In this embodiment, if it is determined at step 185 that additional resources are required, then the additional resources are reserved (step 190) for the group call, and call hosting (step 195) continues.

Figure 3:
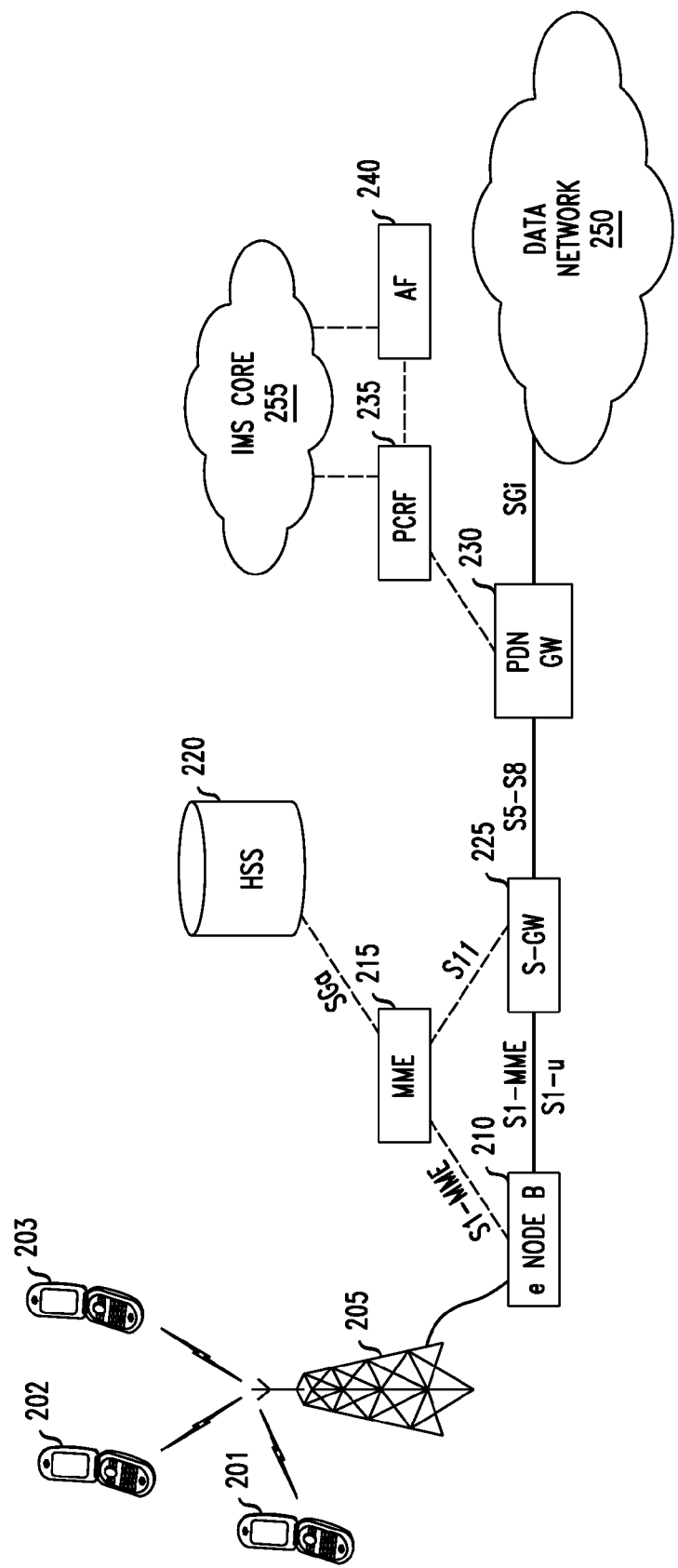
FIG. 3 is a simplified schematic diagram illustrating selected components of a broadband wireless network according to an embodiment of the present invention.

FIG. 3 is a simplified schematic diagram illustrating selected components of a broadband wireless network 200 according to an embodiment of the present invention. Network 200 is, generally speaking, an LTE/IMS network, but the embodiment of FIG. 3 is exemplary and many variations may be possible within the scope of the present invention.

In this embodiment, the base station is referred to as an eNodeB—here eNodeB 210. As with the wireless network 100 described above, there could be and typically are a large number of geographically-dispersed network eNodeBs, which may be interconnected with each other in addition to the connections to the network 200 shown in FIG. 3. When the subscriber associated with UE 201 places or receives a call, a communication channel is established with eNodeB 210 via antenna 205. In most if not all wireless communication networks, protocols are in place to handover communications to another eNodeB if UE 201 relocates (or the need arises for another reason, for example heavy traffic conditions or an equipment outage).

In the embodiment of FIG. 3, communications from UE 201 to one or more other callers are routed through S-GW 225, which among other things acts as a mobility anchor so that communications to and from UE 201, for example, can if necessary be handed over to another eNodeB (not shown) as the UE relocates or as dictated by traffic conditions. From UE 201, calls are routed to a packet data network (PDN) 250 via PDN-GW 230 for communication to the other party or parties to a communication session.

Several call control components are also illustrated in FIG. 3. The MME 215 communicates with both the eNodeB 210 and the S-GW 225 and its duties include handling authentication and signaling for connection and mobility management. The MME 215 is in communication with HSS 220, which maintains user profiles that may include, for example, location and subscription information related to UE 201 and other subscriber devices.

In this embodiment, MME 215 interfaces with both eNodeB 210 and SGW 225. MME 215 also has access to HSS 220, where subscriber data such as user profiles and location information may be stored. The PDN-GW 230 communicates with PCRF 235. PCRF 235 communicates with (or can be considered part of) the IMS core network 255. Also in communication with IMS core network 255 and interfacing with the PCRF 235 is one or more AF server 240. An AF server provides utility applications for use by the network, which in this embodiment includes a PTT server (not separately shown).

Note that in a standard LTE/IMS network such as network 200, the interfaces between these components are frequently referred to as shown in FIG. 3. (For example, the interface between the MME and the HSS is referred to as "Gx") Other interfaces may of course be present in some embodiments. In FIG. 3, interfaces illustrated with a solid line indicate communication channels for user traffic, while the broken line reflects interfaces for control signaling.

In accordance with this embodiment of the present invention, one or more UEs, for example, UEs 201 through 203 depicted in FIG. 3, may participate in a group call. The resources needed to support this group call may vary, but in this embodiment will be allocated according to the present invention, tending to conserve valuable network resources. More specifically, when a bearer is established for communication between a UE and the PDN-GW, the eNodeB will reserve and keep track of the resources allocated to the group call, rather than simply reserving for each group member the resources needed for an individual voice call. In many cases, this will result in fewer resources being reserved in total. The process will now be described in more detail with reference to FIG. 4.

Figure 4:
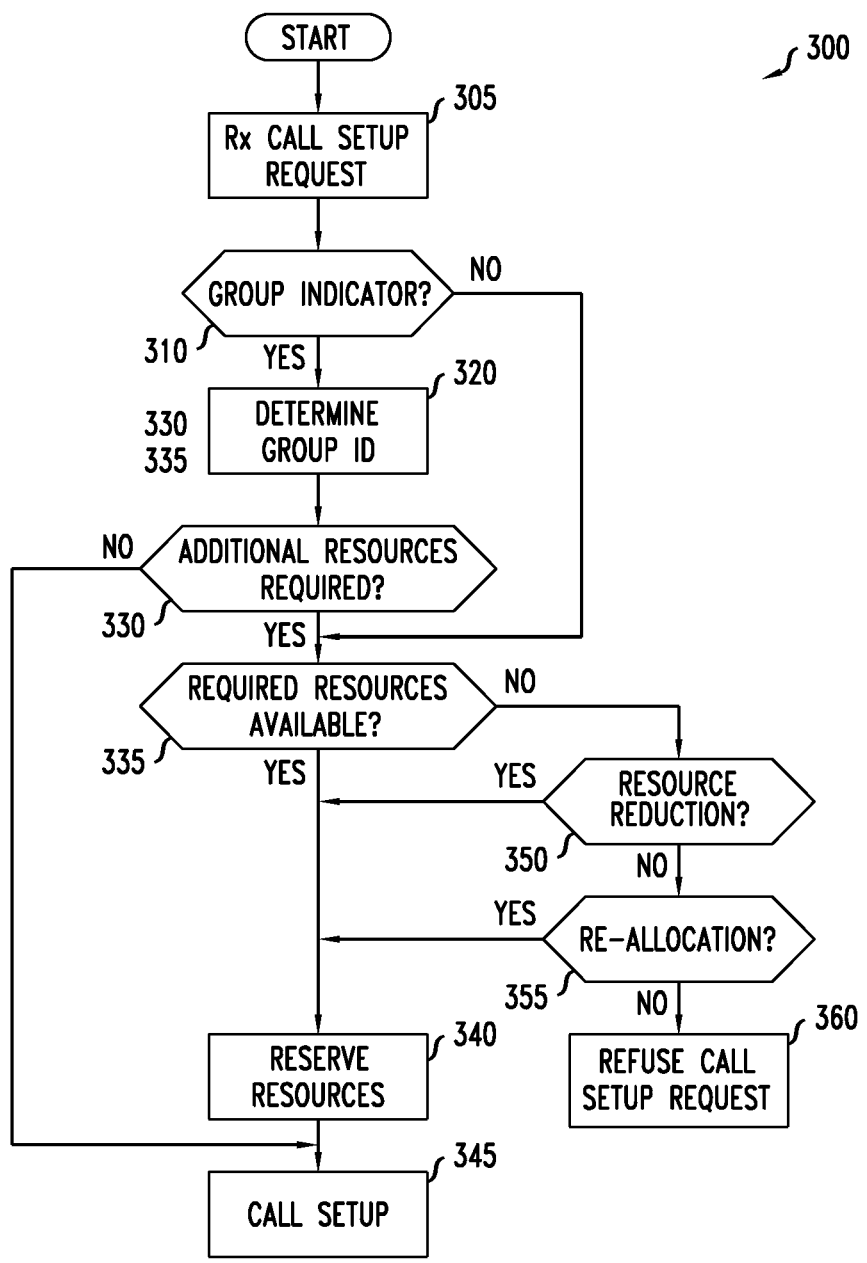
FIG. 4 is a flow diagram illustrating a method of group call control according to an embodiment of the present invention.

FIG. 4 is a flow diagram illustrating a method 300 of group call control according to an embodiment of the present invention. At START it is presumed that the components necessary for performing the method are available and operational according to at least this embodiment of the present invention. The process then begins with the receipt of a call setup request (step 305). In the LTE network of FIG. 3, for example, the call setup request may be the receipt of a Create Bearer Request message in an eNodeB, for example eNodeB 210 shown in FIG. 3. In this case the request may have been sent from MME 215, based on a setup request initiated elsewhere. A call setup request may be initiated, for example, by a UE, by a PTT server, or by another entity within the IMS via the PCRF. In general, the point of initiation may be determined by whether a call group is being established or is being joined, but the identity of the initiating entity is not relevant to the present invention unless specified in a particular embodiment.

In accordance with the embodiment of FIG. 4, when a call setup request has been received, in this case at the eNodeB, it is determined (step 310) whether the call setup request includes a group call indicator. A group call indicator is a flag or other similar device within or associated with the call setup request. In a typical embodiment, the group call indicator, if present, is inserted by the MME in response, ultimately, to an analogous indicator inserted by the entity initiating the call setup request.

In the embodiment of FIG. 4, if the call setup request contains no group call indicator, then it is presumed that it is not associated with a group call. A single voice call is set up if resources are available or can be made available. The exact procedure followed here may vary from one embodiment to another, but in general, this call setup includes determining (at step 330) if the resources necessary are available for the call and responding to the call setup request accordingly, including the reservation of the resources (step 340) associated with an individual voice call.

In this embodiment, if the received call setup request does include a group call indicator, then the group ID is determined (step 320). The group ID will be a value in or associated with the call setup request that identifies the particular group with which this request is associated. Note that, as mentioned above, in other embodiments, the group ID in a call setup request can also serve as the group call indicator, and a separate flag is not needed. If, as in the embodiment of FIG. 4, a separate group call indicator is used, a missing group ID message is sent (not shown) if a group call indicator is present but there is no group ID value; no call setup procedures are executed if a group ID value cannot be determined. At this point, depending on the specific implementation, the call setup may, for example, await the arrival of a proper call setup request, the arrival of a separate message supplying the missing information, or simply treat the call setup request as a normal (single) voice-call request. (These alternatives are not shown in FIG. 4.) In accordance with the present invention, however, the eNodeB or other base station becomes aware that the call setup request is associated with a group call, and responds accordingly.

In the embodiment of FIG. 4, a determination is then made (step 330) as to whether additional resources must be allocated in response to the call set up request. In accordance with the present invention, it may be possible to admit the call while allocating little or no additional resources. In general, in accordance with the present invention it may be necessary to reserve additional resources for control signaling, but not necessarily for voice transmission. If no further resource allocation is necessary, the call is set up (step 345), that is, the UE associated with the call setup request is attached to the eNodeB as a member of the identified group call. A bearer is established between the UE and the PDN-GW via the eNodeB. The determination of whether additional resources are necessary will be described in more detail below.

In accordance with this embodiment of the present invention, if it is determined that additional resources should be allocated in response to the call setup request, it is then determined whether the required resources are available (step 335). If so, then the required resources are reserved (step 340).

Reserving resources, in this embodiment, includes updating a resource allocation table that will affect the disposition of future call setup requests. The resource allocation table is consulted by the admission control module to ensure that calls exceeding the capacity of the network, specifically in this embodiment the base station in question, are not exceeded. Once the additional resources determined necessary are reserved, call setup is effected (step 345), that is, the UE associated with the call setup request is admitted to the group call and attached to the eNodeB (or other base station). Note that in accordance with the present invention it is possible that no additional resources will be required. It is expected that in many cases, fewer resources will be needed than if for each member of the group the resources associated with an individual voice call are reserved. Naturally, if it is determined at step 330 that additional resources are not needed in response to the call setup request, call setup (step 345) may take place immediately In the embodiment of FIG. 4, if the additional resources needed are not available, then a determination (step 350) is made as to whether a response to the call setup request can be made with fewer resources. Such determination may be made, for example, where QoS requirements for the group call may be lowered, where a non-essential channel may be foregone, or where no separate losing-audio support resource reservation will be made (when it otherwise would be). If the call may for whatever reason proceed with sufficiently-fewer resources than originally identified, then the process may proceed to step 340, resource reservation, and call setup (step 345) may proceed. Note that for convenience, a required resource is one that is needed to support the call assuming the resources are available. Required resources may, however, include essential resources—those that should be allocated for the call to be admitted, and non-essential resources—those that may be disregarded so that the call may be admitted, or when the resources are needed for a higher-priority call. In some embodiments (not shown), required (non-essential) resources that are disregarded when a call is admitted may be re-allocated to the call when they become available.

In the embodiment of FIG. 4, if resource reduction at step 350 is not possible, then a determination is made (step 355) as to whether resources devoted to any other ongoing calls can be re-allocated to make more resources available. Other calls may be dropped, for example, or the resources allocated to them diminished, or their QoS adjusted, in order to make more resources available for the pending call setup request. In most implementations, the other calls so examined will not be members of the identified call group, although this may not be true in all cases. If re-allocation is accomplished (not separately shown) and sufficient resources made available, then these resources are reserved (340) for use in association with the call setup request. If, on the other hand, the resources necessary for the call associated with the call setup request are still not available, the call setup request is refused (step 360).

In alternate embodiments (not shown) multiple attempts may be made to allow the call by reducing the resources allocated to it or re-allocating resources from other calls. The call setup request may, for example, merely be put in a queue and reconsidered at a later time, either after a pre-determined period of time has elapsed or upon receipt of a notification (not shown) that additional resources have become available. As mentioned above, it may also be the case in some embodiments that where only diminished resources were allocated in response to a particular call setup request, additional resources may be added in similar fashion when they become available. As should be apparent, the determinations made in steps 350 and 355 may be made in any order, and one or both of them may be omitted, either selectively or entirely, in some implementations.

Note that in some cases call setup requests may still be refused even though the associated group call is already in-progress or even active at a particular eNodeB, although implementation of the present invention is expected make this denial less likely. Finally, it is noted that resource-reduction or resource re-allocation procedures similar to those described above may or may not be followed for non-group (that is, single voice) calls as well as for group calls.

Figure 5:
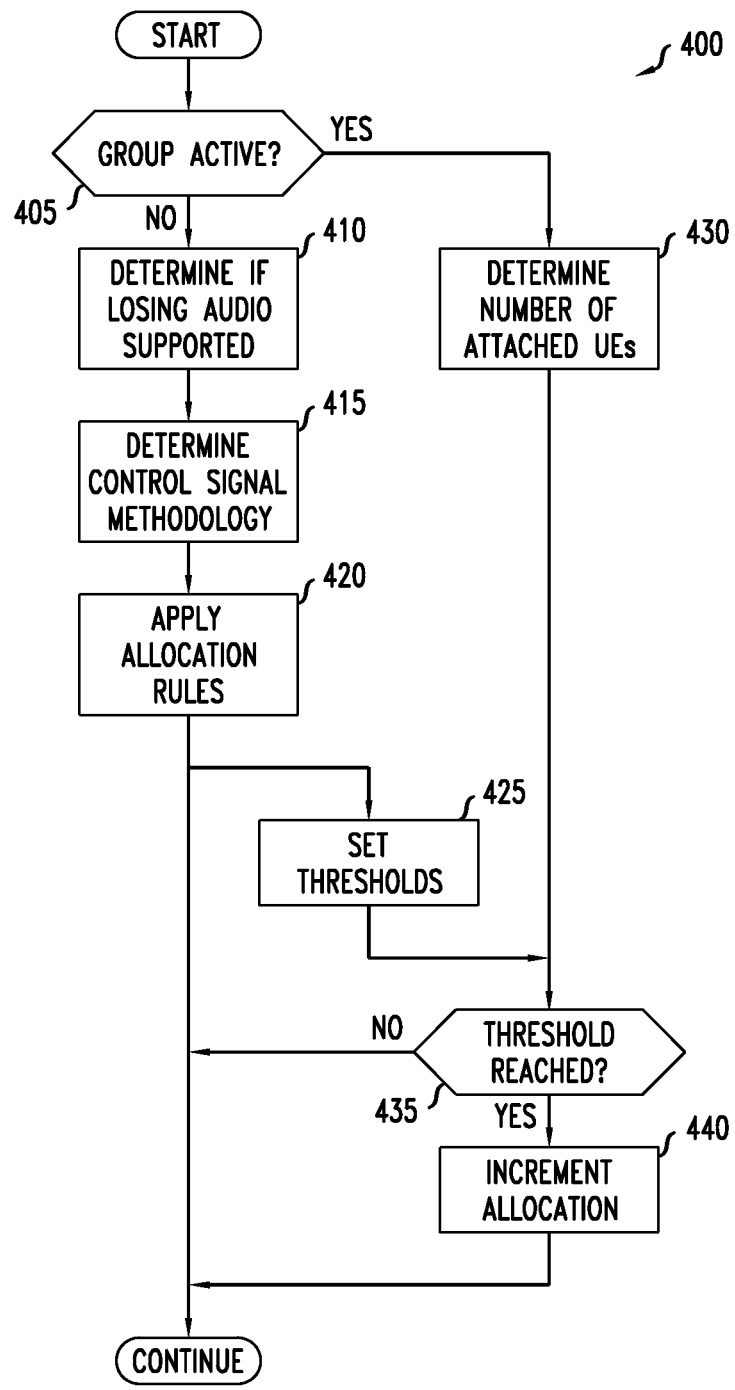
FIG. 5 is a flow diagram illustrating a method of group call control according to an embodiment of the present invention.

FIG. 5 is a flow diagram illustrating a method 400 for call control according to an embodiment of the present invention. Here, the allocation addresses primarily the communication resources that will be dedicated for use by the UE associated with the call setup request and the eNodeB or other base station with which it will be communicating. Method 400 is an exemplary manner of implementing the step 330, shown in FIG. 4, although in embodiments other methods may be used as well. Note also that in other embodiments, all or some of the operations of method 400 may be performed instead at other times during the execution of method 300. In the embodiment of FIG. 5, at START it has already been determined that a received call setup request is associated with a group call, and a group ID has been determined as well.

In accordance with the embodiment of FIG. 5, the process then begins with a determination of whether the group associated with the group ID is active (step 405). In this context, an active group is one having group members attached to the eNodeB. This determination is preferably made by the eNodeB itself, as according to the present invention it is aware of the group affiliation, if any, of the UEs that are attached to it. Note that a group call for the identified group may be in-progress and still not be active with respect to a particular eNodeB. Once a group call set-up request is accepted and positively acted upon at an eNodeB (that is, not rejected), of course, then the group is considered active there (until all group members have unattached).

In this embodiment, if the identified group is not active, then a determination is made as to whether losing audio is to be supported (step 410). As mentioned above, losing audio is a feature whereby any transmission from a UE device that does not have the floor in a group call is nevertheless relayed to at least one other party or to a recording device. At least in some cases, this will require the reservation of additional resources in support. The determination of whether this feature is to be supported may be made in a number of ways. For example, it may be supported for all group calls (or, for that matter, for none). More preferably, the determination is made either on a group-by-group or call-by-call basis.

That is, losing audio may be always supported for particular groups (for example, those associated with particular UEs, or with a certain priority level), while the need for losing audio may be supported selectively for other groups. As one example, a group call involving police, fire fighters, or other first responders may always require support for losing audio. As another, a group of workers at a construction site may only need losing audio support during critical operations or emergencies. In other cases, losing audio may be an optional feature that is supported (that is, required) only if resources are available. Naturally, for selectively-supported losing audio, a mechanism should be provided for requesting support by a call group, and preferably also for notifying the caller whether it can be supported (not shown). Note, however, that the present invention may also be implemented in environments where losing audio is not supported at all, in which case this step 410 may be omitted.

In the embodiment of FIG. 5, the signaling resource requirements are also determined, that is, whether signaling for PTT control will be in-band or out-of-band. In a preferred embodiment, control signaling is transmitted on the same bearer as voice transmissions (that is, in-band), although using a different scheduling discipline. Here again, in some implementations this step may be omitted if signaling resource requirements are consistent for all group calls. In this embodiment, some discrimination is allowed. For example, a separate PTT signal bearer may be allocated for some groups, such as emergency first responders, even where most group calls must rely on in-band signaling.

In this embodiment, the eNodeB or other base station then determines the resources that will be allocated (step 420) should the UE associated with the call setup request be admitted to the group call. To do this, the rules in the allocation rules table are applied, using the characteristics associated with the call determined earlier in the process (or established prior to the START). A resource determination is made for the uplink and for the downlink.

In a preferred embodiment, if the PTT control traffic is to be in-band and losing audio is not to be supported, then the group resources required for the uplink are equal to that of an individual voice call, with additional resources reserved for control signaling for each attached group UE. If PTT control signaling is out of band, then the resources necessary for group call PTT signaling on the additional bearer are required as well. In some embodiments, a set resource allocation for out-of-band group call signaling is used. In others, the resources reserved will vary by the number of UEs that are attached to the eNodeB and associated with a particular group. If so, additional resources may be required for each additional UE that attaches, or the required signaling resources may be determined at this time as well. A similar process is applied for the downlink, preferably using a single multicast channel (plus any resources necessary for signaling) if multicast service, for example MBMS is available. If multicast is not available, of course, a greater number of downlink resources will typically be needed.

By application of the allocation rules, the resources required for admission of the call associated with the call setup request may be determined. In addition, having determined group call characteristics such as losing audio support and control signaling methodology, the additional resources needed to attach additional members of the same group to the eNodeB may also be calculated at step 420. In accordance with the present invention, thresholds are also associated with the group (step 425) so that increases in group activity may be addressed.

As one example, a losing audio support threshold may be set as follows:

TABLE 1

| Number of UEs in group g attached to an eNodeB | Resources m reserved for losing audio support (v = resources for a single voice call uplink) |
|---|---|
| 1 | 0 |
| 2-20 | 1v |
| >20 | 2v |

In this example, if there is only one UE in a group attached to the eNodeB, no additional resources are needed to support losing audio, even if it supported for this group. When a second UE in the group is associated with a call setup request, however, resources equivalent to those associated with a single voice call are needed to support losing audio. This is true even where the addition of the second UE itself would not require any additional resources (outside of losing audio support), because all members of the group share the same uplink channel.

Similar thresholds may be set to accommodate out-of-band signaling. And in some implementations, it may be considered prudent to simply require the reservation of additional uplink channels when a certain number of UEs have attached, regardless of losing audio or signaling requirements. Note that in some cases, additional resource requirements may be indicated as non-essential, meaning that they may not be reserved if a call would otherwise be refused due to a lack of unallocated resources. Non-essential resources may in some cases also be re-allocated to higher priority calls. Finally, note that resource thresholds may, but are not necessarily calculated as a function of those needed for a single voice call (v in TABLE 1), but may instead be established in some other fashion.

Returning to the embodiment of FIG. 5, once the allocation rules have been applied at step 420 and the resources for the call have been determined, the process simply continues. Method 400 will start again when another call setup request is received. With respect to the current call setup request, the process simply returns to step 335 of the method 300 (shown in FIG. 4) and it is determined if the resources determined can be satisfied.

In the embodiment of FIG. 5, if it determined at step 405 that the identified group is active with respect to the eNodeB, then a determination is made as to how many group members are attached to the eNodeB at the present time (step 430). A determination can then be made as to whether the current call setup request will reach a previously-set threshold (step 435). If so, the incremental additional resources required are determined (step 440) and the process may continue with a determination (at step 335) as to whether the incremental resources associated with this call setup request are available. If, on the other hand, it is determined at step 435 that no threshold has been reached, then no additional resources need be allocated. In this case, of course, the process continues, in this case with call setup at step 345.

Note that the steps of the above described methods do not necessary have to be performed in the sequence shown; but rather may be performed in any logically-consistent sequence unless explicitly specified to the contrary in a particular embodiment. Finally, operations in addition to those described may be inserted into the sequence of operations, and in some cases operations may be deleted, without departing from the spirit of the invention.

In a preferred embodiment, the resource allocation rules illustrated in TABLE 2 are employed. Note here, taken into account is the circumstance that in some environments, multicast for the downlink may not be available, and individual resources must be allocated for downlink channels to each of the separate UEs attached to an eNodeB or other base station. For the uplink, of course, the invention still takes advantage of the fact that, for a talk group, nominally only one UE will transmit at a given time. The resources required according to this embodiment are summarized as follows:

TABLE 2

| | Configuration | Resource Required (in bps) |
|---|---|---|
| Uplink | Single bearer for voice and PTT control (in-band signaling) | $\alpha * x + n * y$ |
| | Separate bearers for voice and PTT control (out-of band signaling) | $\alpha * x$ for voice $n * y$ for PTT control |
| Downlink | No MBMS | $\alpha * n * x + z$ |
| | With MBMS | $\alpha * x + z$ | where:
x is the nominal bit rate of the voice codec.
y is the effective bandwidth of the PTT control traffic, from the UE
z is the effective bandwidth of the PPT control traffic from the PTT server
n is the number of UEs belonging to the same talk group and attached to the eNodeB
$\alpha$ is the voice activity factor The voice activity factor is a value reflecting the actual or expected use of the uplink by the group, and in many implementations will be a value close to 1. In a preferred embodiment, the voice activity factor is initially set at 0.80 and the actual level of activity is monitored. The voice activity factor may then be adjusted up or down to ensure that the desired QoS is met.

Note in the embodiment of TABLE 2, that if losing audio is supported, then additional resources must be reserved for the uplink. In a preferred embodiment, an additional m*x resources (see TABLE 1) are required.

From the above, it should be apparent that the voice traffic requires x bps (GBR service in the LTE context), and control signaling requires (non-GBR) service at y bps. When a first UE at an eNodeB joins a talk group, a bearer is established between the UE and the PDN-GW (assuming that both voice traffic and signaling traffic are mapped onto the same bearer). The eNodeB will reserve resources to support x bps for GBR traffic and y bps for non-GBR traffic.

When an additional UE joins the same talk group and attaches to the eNodeB, it would also establish a bearer between the UE and the PDN-GW. However, the eNodeB would only reserve x bps for GBR traffic and 2*y bps for both channels.

In a preferred embodiment, when a transmission occurs, reserved resources are allocated to the transmission on a priority basis. In LTE networks, for example, various schedule schemes are used. In persistent scheduling, blocks of resources are allocated to an entity for transmission, while in dynamic scheduling an entity must first request a time slot or slots for transmission. Semi-persistent scheduling allocates blocks of resources to an entity when it is active, but revokes the allocation during periods of inactivity. In accordance with a preferred embodiment of the present invention, voice transmissions in group calls are scheduled using semi-persistent scheduling, while PTT control messages are allocated resources using dynamic scheduling. In some embodiments, the scheduling scheme may be assigned or changed based on the priority of the group call.

In accordance with a preferred embodiment of the present invention, if losing audio is not supported for the group call, when a UE sends a scheduling request (SR) to the eNode requesting persistent or semi-persistent schedule, the eNode will then allocate the appropriate schedule discipline to the requesting UE to support the x bps GBR traffic. In addition, because of the higher layer PTT control protocol, only one of the two UE will send a scheduling request to the eNodeB.

In accordance with this preferred embodiment, the process is similar for the case when losing audio is supported. The difference is that more resources must be reserved to accommodate the possibility that more than one UE may be requesting service at the same time. For example, if there are ten UEs joining the same talk group at the eNodeB, the eNodeB's policy rules may allocate resources to support 2*x bps GBR traffic (for two possible voice calls) and resources for 10*y bps for the non-GBR control traffic.

In this preferred embodiment, if three or more UEs are requesting to transmit at the same time. In this example, the eNodeB would grant services to two calls (one for group voice, one for losing audio). Transmission requests above this limit may be admitted if there are sufficient resources to support them. Otherwise, they are rejected. In this case, however, it must be ensured that the UE that has been granted the floor is not blocked by transmission service requests from UEs that are sending (or attempting to send) losing audio. There are a number of ways to do this in the LTE environment, where there are two methods to request scheduling. That is, transmission service in LTE may be requested via a scheduling request (SR) or a buffer status report (BSR). In one method, the UE that wins the floor always uses SR to request scheduling, while UE transmitting losing audio will use BSR.

As an example of another method in an LTE environment, BSR information is encoded as one or more MAC (media access control) control element in a MAC message. In accordance with the present invention, a new element may be defined containing the following information:

The priority of the scheduling request

The scheduling discipline requested (dynamic, persistent, and semi-persistent).

In this case, the scheduling request for UE attempting to send losing audio would be encoded with a lower priority than the UE that currently has the floor. With implementation of this new element, the eNodeB can distinguish which UE are sending losing audio or the winning audio. Resources allocated to losing audio could be pre-empted by winning audio if needed.

The allocation and scheduling methods described above are exemplary and not limiting; in other embodiments, other alternative methods may be used as well.

Figure 6:
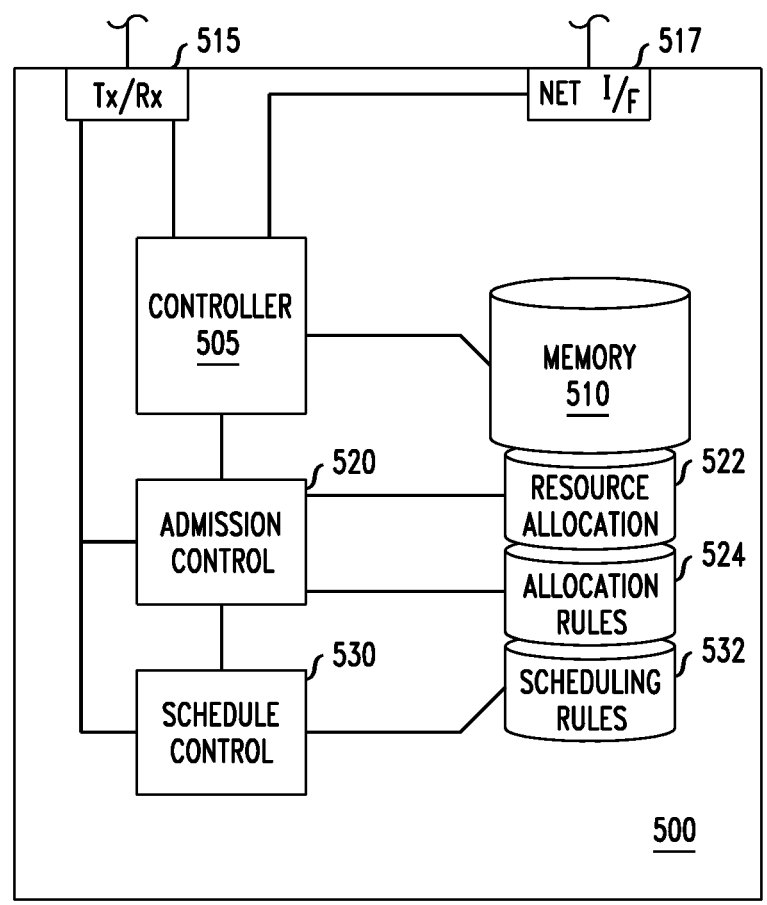
FIG. 6 is a block diagram illustrating selected components of a broadband wireless network base station according to an embodiment of the present invention.

FIG. 6 is a block diagram illustrating selected components of a base station 500 according to an embodiment of the present invention. Base station 500, in this embodiment, has a controller 505 for controlling the various components of the base station and a memory device 510 for storing data and program instructions. A transceiver 515 in communication with an antenna (not shown) is provided for communication with UEs over an air interface. Network interface 517 provides for communication with the rest of the wireless network, for example through an S-GW (see FIG. 3).

In accordance with this embodiment of the present invention, base station 500 includes an admission control module 520 and a scheduling module 530. Admission control module 520 determines whether a call setup request can be supported with the communication resources available. A resource allocation table 522 is provided to monitor which communication resources are reserved, most importantly for those involved in wireless communication with UEs. In this embodiment, admission control module 520 refers to resource allocation table 522 and determines whether the call setup request is associated with a group that is already active at the base station. If so, it determines whether a threshold has been reached for incrementing the resources needed for the group call. As mentioned above, in accordance with preferred embodiments of the present invention a single voice channel may be reserved for each group call for the uplink, and for the downlink as well if multicast transmissions are supported. Additional resources required for the support of control signaling and, if applicable, losing audio, and incremented when a threshold reflected in resource allocation table 522 has been met.

In the embodiment of FIG. 6, if a call setup request is received at the base station is associated with a group call that is not active with respect to the base station, the admission control module 520 refers to the allocation rules module 524 to determine the resources that are required to support the group call, and preferably to set the thresholds that will govern incrementing of reserved resources if additional members of the group attempt to join through the base station.

The scheduling module 530 controls the prioritization of transmissions with reference to scheduling rules table 532. As mentioned above, in accordance with a preferred embodiment of the present invention, for group calls voice is preferably scheduled on a semi-persistent scheduling basis, while control signals are governed by dynamic scheduling. Changes may be made, however, by updating the scheduling rules table 532.

In this manner, a more efficient scheme for the use of network resources is provided for when UE devices are participating in a group call, particularly when they are attached to the same base station, such as the eNodeB in an LTE/IMS wireless communication network.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims. For example, although described above largely in terms of an LTE or LTE/IMS network, the methods and system disclosed are expected to also be advantageously applicable in other wideband wireless networks, for example in a WiMax environment.

The invention claimed is:

1. A method for group call admissions control in an LTE wireless communication network, comprising:
    receiving at a network base station a call setup request requesting that a bearer be set up from a UE to a PDN-GW;
    determining whether the call setup request contains a group ID;
    determining, if the call setup request contains a group ID, whether base station resources are already allocated to the identified group;
    determining, if resources have already been allocated to the group, whether additional resources are required to set up the call;
    admitting the call if no additional resources are required, wherein admitting the call comprises establishing a bearer for communications between the UE and a PDN-GW; and,
    determining whether losing audio is to be supported by the group, wherein the determination of whether losing audio is to be supported is a function of the group ID of the call setup request.

2. The method of claim 1, wherein determining whether additional resources are required comprises determining how many group UEs are attached to the base station and determining whether a resource threshold has been met by the UE associated with the call setup request.

3. The method of claim 1, further comprising determining whether any additional resources required to set up the call are available.

4. The method of claim 3, further comprising admitting the call if any additional resources required to set up the call are determined to be available.

5. The method of claim 3, further comprising rejecting the call setup request if the required additional resources are not available.

6. The method of claim 5, further comprising, prior to rejecting the call setup request, determining whether a portion of the required additional resources can be disregarded as non-essential so that the call setup may proceed.

7. The method of claim 5, further comprising, prior to rejecting the call setup request, re-allocating resources reserved for other calls so that the call setup may proceed.

8. The method of claim 3, further comprising reserving any additional resources determined to be required.

9. The method of claim 1, wherein the base station is an eNodeB and the call setup request is a Create Bearer Request message.

10. A method for group call admissions control in a broadband wireless communication network, comprising:
   receiving a call setup request;
   determining whether the call setup request contains a group call indicator;
   determining, if the call setup request contains a group call indicator, whether the call set up request contains a group ID;
   determining, if the call setup request contains a group ID, whether the group is active;
   determining, if the group is not active, whether the resources required for the group call are available;
   admitting the group call if it is determined that the group is not active and the resources required for the group call are available; and,
   determining whether losing audio is to be supported for the group, wherein the determination of whether the losing audio is to be supported is a function of whether the resources required for the group call are available.

11. The method of claim 10, further comprising reserving the resources required for the group call.

12. The method of claim 11, further comprising setting at least one resource allocation increment threshold.

13. The method of claim 11, further comprising releasing the group call resources associated with the group ID.

14. The method according to claim 10, wherein the call setup request is received in a base station of the wireless communication network.

15. The method of claim 10, wherein the determination of whether to allocate additional group call resources is based at least in part on system performance.

16. A base station for a broadband wireless communication network, comprising:
   a controller;
   a memory device;
   an admission controller in communication with the controller and with the memory device, wherein the admission controller determines for every group call setup request received at the base station whether the group is active with the respect to the base station;
   a resource allocation table for recording resources reserved for each group call active at the base station and any resource thresholds that have been set;
   an allocation rules table for recording resource determination criteria; and
   a transmission scheduler for prioritizing transmissions according to currently-set scheduling rules, wherein the currently-set scheduling rules include a rule for applying semi-persistent scheduling to voice transmissions and dynamic scheduling to the transmission of control messages.

* * * * *